(12) United States Patent
Li et al.

(10) Patent No.: US 12,551,358 B2
(45) Date of Patent: Feb. 17, 2026

(54) STENT DELIVERY AND RELEASE DEVICE AND STENT DELIVERY AND RELEASE SYSTEM

(71) Applicant: HANGZHOU ENDONOM MEDTECH CO., LTD, Zhejiang (CN)

(72) Inventors: Anwei Li, Hangzhou (CN); Lei Wang, Hangzhou (CN); Yongsheng Wang, Hangzhou (CN)

(73) Assignee: Hangzhou EndoNom Medtech Co., Ltd, Hangzhou (CN)

( * ) Notice: Subject to any disclaimer, the term of this patent is extended or adjusted under 35 U.S.C. 154(b) by 836 days.

(21) Appl. No.: 17/845,577

(22) Filed: Jun. 21, 2022

(65) Prior Publication Data
US 2022/0313463 A1 Oct. 6, 2022

Related U.S. Application Data

(63) Continuation of application No. PCT/CN2020/138439, filed on Dec. 22, 2020.

(30) Foreign Application Priority Data

Dec. 23, 2019 (CN) .......................... 201911341650.1
Dec. 23, 2019 (CN) .......................... 201911341841.8
(Continued)

(51) Int. Cl.
*A61F 2/95* (2013.01)
*A61F 2/844* (2013.01)
(Continued)

(52) U.S. Cl.
CPC ................ *A61F 2/95* (2013.01); *A61F 2/844* (2013.01); *A61F 2/848* (2013.01); *A61F 2/9522* (2020.05);
(Continued)

(58) Field of Classification Search
CPC .. A61F 2/82; A61F 2/95; A61F 2/9522; A61F 2/954; A61F 2/958; A61F 2002/9505; A61F 2002/9511; A61F 2002/9665
See application file for complete search history.

(56) References Cited

U.S. PATENT DOCUMENTS

2014/0135907 A1  5/2014  Gallagher et al.
2020/0360127 A1 11/2020  Weiqiang

FOREIGN PATENT DOCUMENTS

CN        106063735 A    11/2016
CN        205831968 U    12/2016
(Continued)

OTHER PUBLICATIONS

International Search Report dated Mar. 22, 2021 for corresponding PCT Application No. PCT/CN2020/138439.

*Primary Examiner* — William H Matthews

(57) ABSTRACT

Disclosed are a stent delivery and release device and a stent delivery and release system. The stent delivery and release device (20) includes a stent proximal end release assembly provided at a proximal end of the stent delivery and release device, a guide head provided at a distal end of the stent delivery and release device, and a control member, wherein an external stent is configured to be loaded between the guide head and the stent proximal end release assembly; a proximal end of the control member is connected to the stent proximal end release assembly, and at least part of a distal end of the control member is wound around the stent and is detachably connected to the guide head; and the stent proximal end release assembly folds or releases the stent by controlling the axial length of the control member.

20 Claims, 12 Drawing Sheets

(30) Foreign Application Priority Data

Dec. 23, 2019 (CN) .......................... 201922337203.0
Dec. 23, 2019 (CN) .......................... 201922337204.5

(51) Int. Cl.
*A61F 2/848* (2013.01)
*A61F 2/954* (2013.01)
*A61F 2/966* (2013.01)

(52) U.S. Cl.
CPC .............. *A61F 2/954* (2013.01); *A61F 2/966* (2013.01); *A61F 2002/8486* (2013.01); *A61F 2002/9665* (2013.01)

(56) References Cited

FOREIGN PATENT DOCUMENTS

| | | |
|---|---|---|
| CN | 107296668 A | 10/2017 |
| CN | 207071112 U | 3/2018 |

STENT DELIVERY AND RELEASE DEVICE AND STENT DELIVERY AND RELEASE SYSTEM

CROSS-REFERENCE TO RELATED ART

The present disclosure claims priority to international patent application PCT/CN2020/138439 filed on Dec. 22, 2020, which claims priorities to Chinese Application Nos. 201911341841.8 and 201922337204.5 both filed on Dec. 23, 2019 and entitled "stent delivery and release device and stent delivery and release system", and Chinese Application Nos. 201922337203.0 and 201911341650.1 both filed on Dec. 23, 2019 and entitled "covered stent system and covered stent", disclosures of all of which are incorporated herein by reference.

TECHNICAL FIELD

The present disclosure relates to the technical field of medical devices, and particularly to a stent delivery and release device, and a stent delivery and release system.

BACKGROUND

Endovascular repair is an effective treatment for thoracic and abdominal vascular diseases, and has found wide use in the past ten years. A covered stent is an implantable device including a tubular surgical implant sheath and a self-expandable frame. A vascular stent needs to be released in a vascular segment to be repaired with the aid of a delivery system. The vascular stent is implanted inside a blood vessel to isolate an aortic aneurysm and re-establish a blood flow path, so that the hemodynamic pressure cannot reach the site of vascular diseases. Regardless of a true aneurysm, a false aneurysm, or a dissecting aneurysm, they are all caused by damages and lesions of blood vessels with different degrees. A blood vessel itself may have an irregular morphology, which requires the delivery system with a good guiding performance.

An aortic stent is implanted by compressing the stent into a delivery and release device, then inserting a guide wire via a minimally invasive incision via a femoral artery, and delivering the stent to the site of aortic lesion via the delivery system over the guide wire previously inserted in the human body, with the assist of an imaging device, the stent is delivered to an accurate site of lesion, and released and implanted at the lesion site. A problem usually encountered by a surgeon during the operation process is that a proximal end or a distal end of the stent is released when the release condition of the stent is not met due to the unstable operations of instruments, complex vascular structure, narrow surgical field, and others, which results in that the stent is released to an inaccurate position, causing a series of subsequent problems and uncertainties, and ultimately causing failure of releasing the stent. Therefore, it requires the delivery system to have the performances of precise and convenient delivery, accurate and safe release, and easy retraction.

SUMMARY

An objective of the present disclosure is to provide a stent delivery and release device and a stent delivery and release system, so as to solve the technical problem that a proximal end or a distal end of a stent is released when the release condition of the stent is not met, which results in that the stent is released in an inaccurate position, ultimately causing release failure of the stent.

The present disclosure provides a stent delivery and release device, which includes a stent proximal end release assembly, a guide head and a control member, wherein the stent proximal end release assembly is provided at a proximal end of the stent delivery and release device, the guide head is provided at a distal end of the stent delivery and release device, and an external stent is configured to be loaded between the guide head and the stent proximal end release assembly; a proximal end of the control member is connected to the stent proximal end release assembly, at least part of a distal end of the control member is wound around the stent and detachably connected to the guide head; and the stent proximal end release assembly folds or releases the stent by controlling an axial length of the control member.

The present disclosure further provides a stent delivery and release system, which includes a stent, and a stent delivery and release device as described above. The stent is configured to be loaded between the guide head and the stent proximal end release assembly.

In summary, after the stent proximal end release assembly of the present application folds or releases the stent, that is, the stent proximal end release assembly can repeatedly fold and release the stent, the stent can be released to an accurate site of lesion, realizing the success release of the stent. This solves the technical problem that a proximal end or a distal end of a stent is released when the release condition of the stent is not met, such that the release position of the stent is inaccurate, causing a series of subsequent problems and uncertainties, and ultimately causing release failure of the stent.

BRIEF DESCRIPTION OF THE DRAWINGS

To describe the technical solutions according to the embodiments of the present disclosure or in the prior art more clearly, the drawings needed to be used in the embodiments or in the prior art will be described briefly below. Apparently, the drawings in the following description show merely some embodiments of the present application. Other drawings can be obtained by persons of ordinary skill in the art based on these drawings without creative efforts.

FIG. 14b is another structural schematic view of the tail slider shown in FIG. 14a.

FIG. 15b is another structural schematic view of the release slider cover shown in FIG. 15a.

DESCRIPTION OF THE EMBODIMENTS

Hereinafter, the technical solutions according to the embodiments of the present disclosure will be clearly and completely described with reference to drawings in the embodiments of the present disclosure. Apparently, the embodiments described are merely some embodiments, but not all of the embodiments of the present application. All other embodiments obtained by persons of ordinary skill in the art based on the embodiments of the present disclosure without creative efforts shall fall within the protection scope of the present disclosure.

It should be noted that for a stent, an end adjacent to the heart after implantation in a blood vessel is generally defined as a "proximal end" of the stent, an end far away from the heart after implantation in the blood vessel is defined as a "distal" end of the stent, and the "proximal end" and "distal end" of any component in the stent are defined according to this rule. For a delivery device, an end close to an operator is generally defined as a "proximal end", an end far away from the operator is defined as a "distal end", and the "proximal end" and "distal end" of any component in a delivery system are defined according to this rule. "Axial direction" generally refers to a length direction of a stent when it is delivered, "radial direction" generally refers to a direction of the stent that is perpendicular to its "axial direction", and the "axial direction" and "radial direction" of any component in a covered stent are defined according to this rule.

Figure 1:
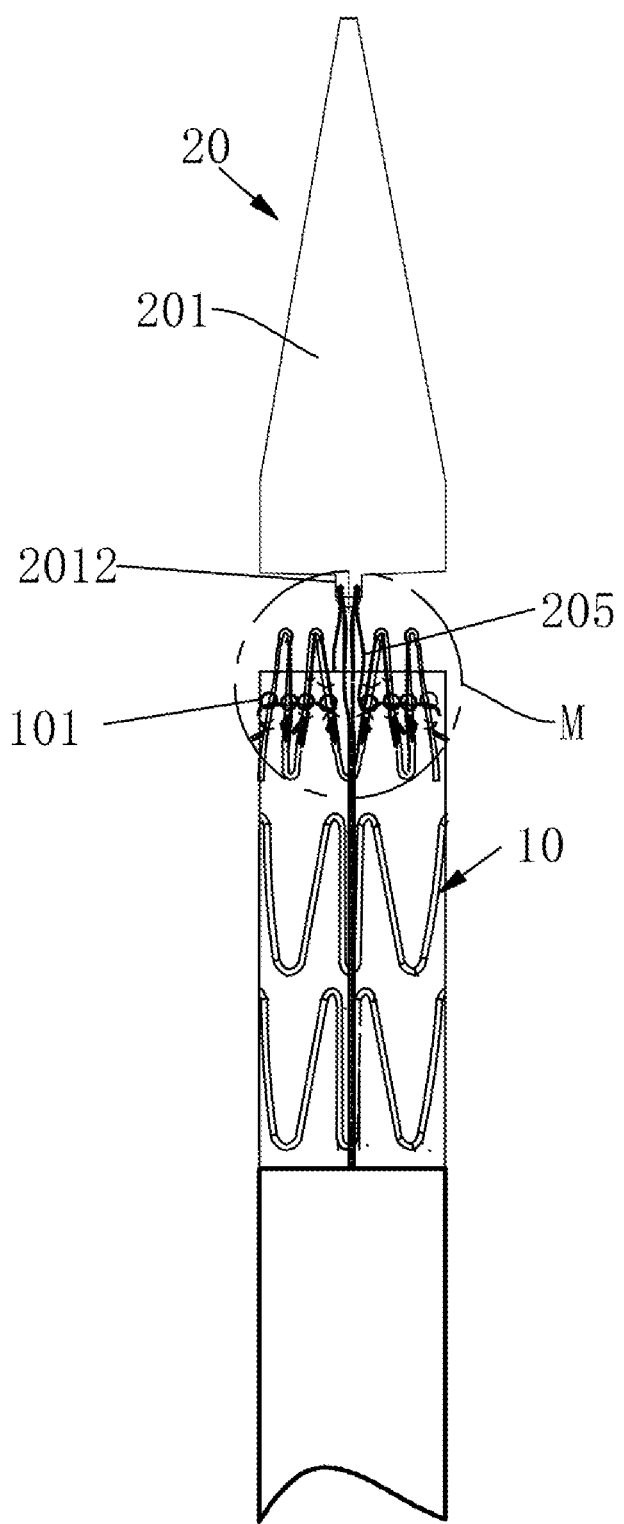
FIG. 1 is a structural schematic view of a stent delivery and release system provided in the present disclosure.
Figure 2:
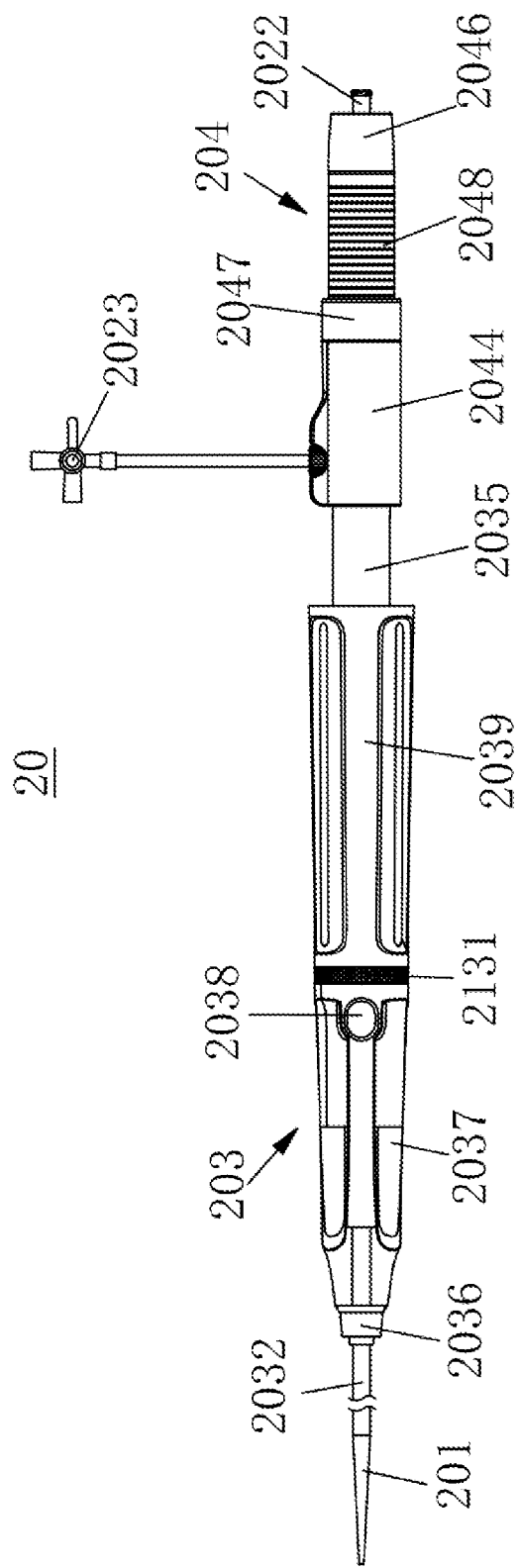
FIG. 2 is a structural schematic view of the stent delivery and release device shown in FIG. 1.

Referring to FIG. 1, the present disclosure provides a stent delivery and release system. The stent delivery and release system includes a stent 10 and a stent delivery and release device 20, wherein the stent delivery and release device 20 is configured to control a proximal end of the stent 10 to radially retract or expand, so as to release the stent 10 into a blood vessel. The stent delivery and release device 20 can fold or release the stent 10 repeatedly to adjust the implantation position of the stent 10, such that the stent 10 can be accurately released onto an inner wall of the blood vessel, to achieve the therapeutic function of the stent 10 in the blood vessel. The stent delivery release device 20 will be described in detail below.

Referring to FIGS. 2 to 5, the stent delivery and release device 20 includes a guide head 201, a core assembly 202, a sheath assembly 203, and a stent proximal end release assembly 204. The guide head 201 is provided at a distal end of the stent delivery and release device 20, and particularly at a distal end of the core assembly 202. The stent proximal end release assembly 204 is provided at a proximal end of the stent delivery and release device 20, and particularly at a proximal end of the core assembly 202. The sheath assembly 203 is mounted around the core assembly 202. The stent proximal end release assembly 204 is configured to fold or release the stent 10 repeatedly, such that the stent 10 can be accurately released to a treatment site in a blood vessel.

After the stent proximal end release assembly 204 according to the present application folds or releases the stent 10 repeatedly, that is, the stent proximal end release assembly 204 repeatedly retracts and releases the stent 10, the stent 10 can be accurately released to the site of lesion. This ensures the successful release of the stent 10, thus solving the technical problem that the proximal end or the distal end of the stent 10 is released when the release condition of the stent 10 is not met, which results in that the stent 10 is released to an inaccurate position, causing a series of subsequent problems and uncertainties, and ultimately causing failure of releasing the stent 10. To ensure a good attachment of the stent to the wall of the blood vessel, the diameter of the stent after complete release needs to be 10-15% greater than the diameter of the blood vessel, if the stent in the prior art is fully expanded after release at an inaccurate position, the stent is difficult to move, and cannot be repositioned.

Figure 3:
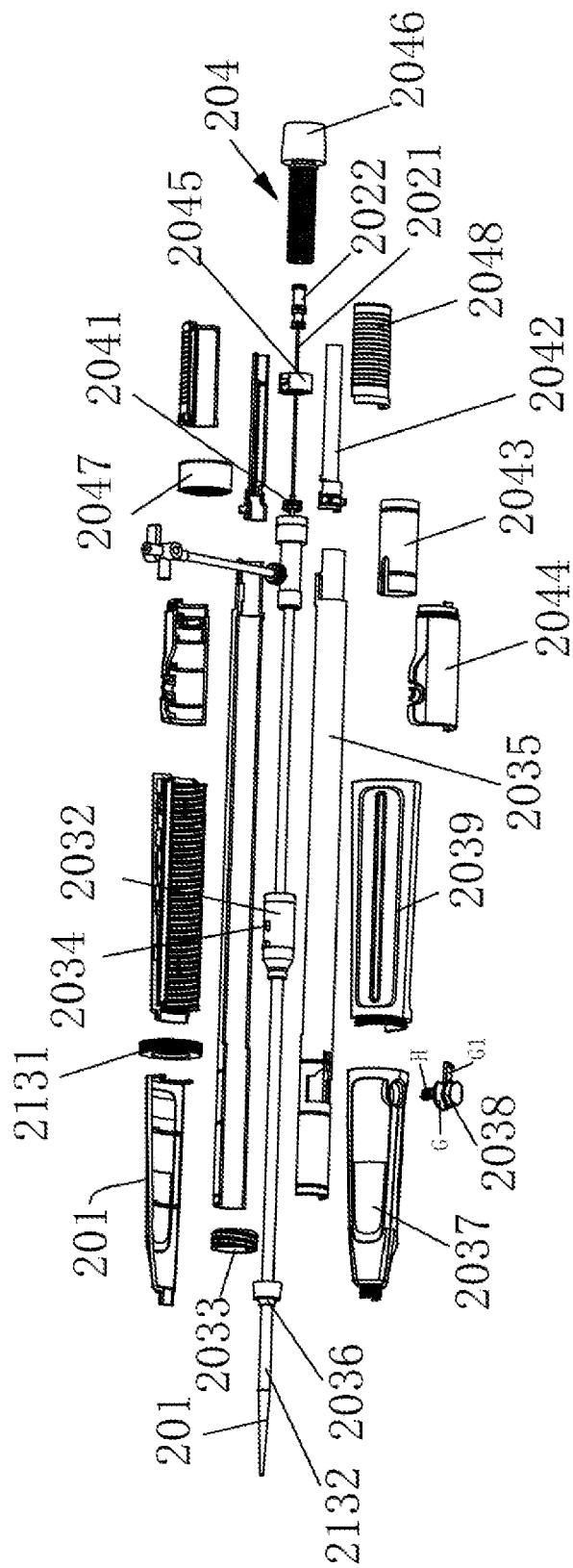
FIG. 3 is a structural schematic exploded view of the stent delivery and release device shown in FIG. 2.
Figure 4:
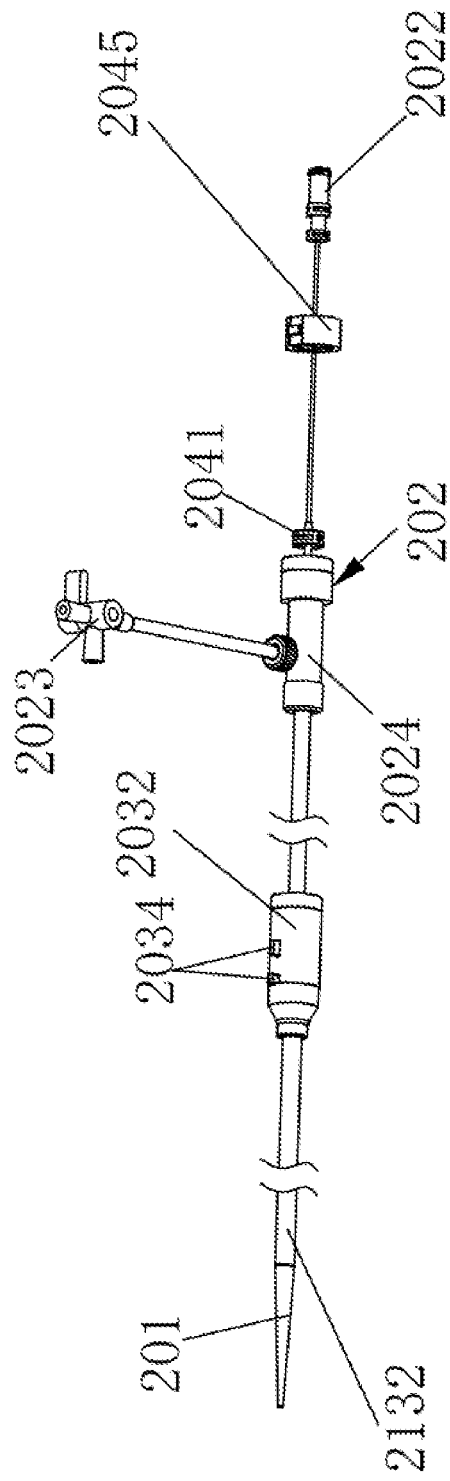
FIG. 4 is a structural schematic view of a part of the structure shown in FIG. 3.

As shown in FIGS. 1 and 3, the stent 10 is configured to be loaded between the guide head 201 and the stent proximal end release assembly 204, and implanted at a lesion site under the guidance of the guide head 201. The stent delivery and release device 20 further includes a control member 205. At least part of a distal end of the control member 205 is wounded onto the stent 10, and detachably connected to the guide head 201. A proximal end of the control member 205 is connected to the stent proximal end release assembly 204. The stent proximal end release assembly 204 folds or releases the stent by controlling the axial length of the control member 205.

Figure 6:
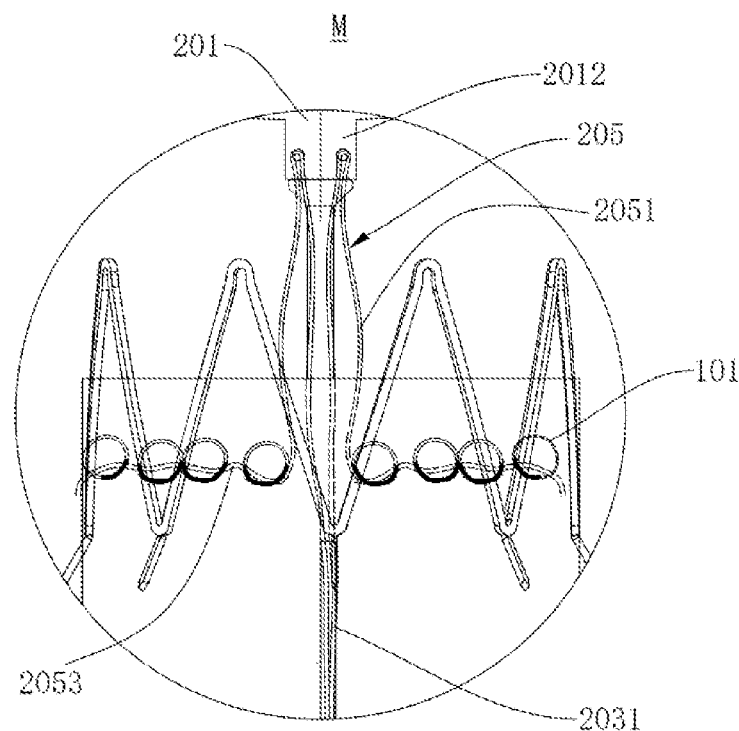
FIG. 6 is a structural schematic enlarged view of a portion M shown in FIG. 1.
Figure 8:
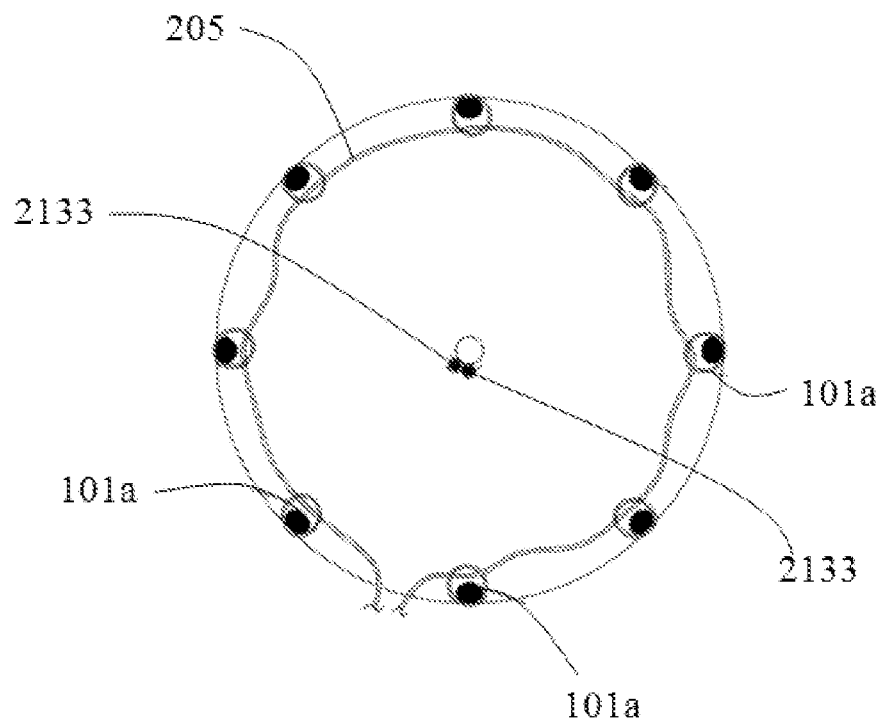
FIG. 8 is a structural schematic top view of the portion M shown in FIG. 1.

Referring to FIGS. 6 and 8, particularly, a plurality of connecting members 101 are provided at a proximal end of the stent 10, wherein each peak at the proximal end of the stent 10 is provided with a connecting member 101 at a middle portion thereof. The connecting members 101 are circumferentially arranged into at least one circle at the proximal end of the stent 10. The control member 205 extends through the connecting members 101, such that at least part of the control member 205 is wound around the proximal end of the stent 10, to fold or release the proximal end of the stent 10. The connecting members 101 may be loops; through-hole structures 101a on the stent 10; separate structures which are fixedly connected to the stent 10, with each connecting member 101 having a through-hole structure 101a; flexible rings fixed to the stent 10; formed by a pulling string circumferentially fixed to the stent 10 at positions with intervals, with gaps formed between the string fixed at intervals and the stent 10 for the control member 205 extending through; or connecting rings arranged on the stent, each of which has a through hole structure. The connecting members 101 are fixedly connected to the stent by stitching, thermal bonding or welding.

Accordingly, in this embodiment, the control member 205 is connected to the stent proximal end release assembly 204, and detachably connected to the guide head 201, and at least part of the control member is wound around the proximal end of the stent 10, such that after the stent 10 is released at a first time, the stent delivery and release device 20 will not be disengaged from the stent. The stent delivery and release device 20 can fold the stent 10 by means of the control member 205 and adjust the release position again, so as to fold or release the stent 10 again. In this way, in case that the stent 10 is released at an inaccurate position, the stent 10 can be adjusted and released again to allow the stent 10 to be released to an accurate position. The stent delivery and release device 20 of the present application can release the stent 10 stepwise by the control member 205, to enable the accurate positioning of the stent 10 and achieve a high assembly stability.

In this embodiment, the control member 205 includes a flexible elongated structure, wherein the flexible elongated structure surrounds the stent 10. It can be understood that the control member 205 may further include a rigid elongated structure connected to a proximal end of the flexible elongated structure 20, wherein the rigid elongated structure is inserted in the sheath assembly 203.

In this embodiment, the control member 201 surrounds the proximal end of the stent 10. In an alternative embodiment, in addition to being wound onto the proximal end of the stent 10, the control member 201 may also extend circumferentially from the proximal end of the stent 10 to a middle portion of the stent 10 and to the distal end of the stent 10.

Figure 9:
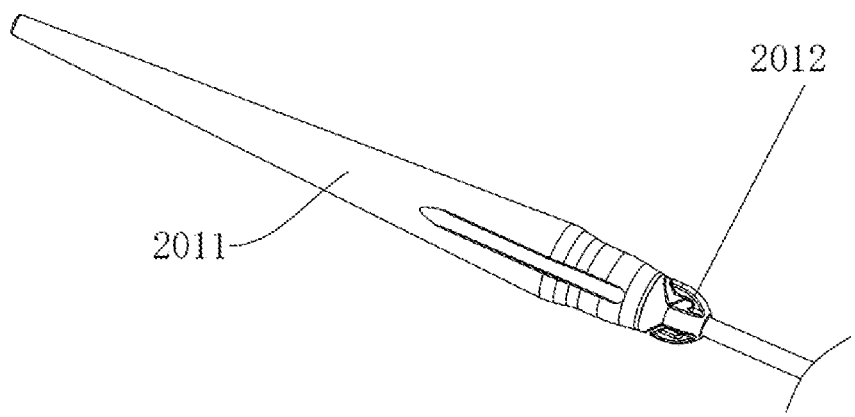
FIG. 9 is a structural schematic view of a guide head shown in FIG. 2.

Referring to FIG. 9, the guide head 201 includes a first body portion 2011, and a first fixing member 2012 provided at a proximal end of the first body portion 2011. The first fixing member 2012 is detachably connected to the control member 205. Specifically, a distal end of the first body portion 2011 has a conical structure, and the first fixing member 2012 is optionally an anchoring hook, which is detachably connected to the control member 205.

Referring to FIG. 4 again, the core assembly 202 includes an inner core 2021, a Luer fitting 2022, a three-way valve 2023, and a three-way pipe fastener 2024. The inner core 2021 is connected to a proximal end of the guide head 201. The Luer fitting 2022 is connected to a proximal end of the inner core 2021. The three-way pipe fastener 2024 is provided on an outer periphery of the inner core 2021. Two ends of the inner core 2021 extends through two ends of the three-way pipe fastener 2024 in an axial direction of the three-way pipe fastener 2024. The three-way pipe fastener 2024 is a hose that is fixedly connected to the three-way valve. The three-way pipe fastener 2024 communicates with the three-way valve 2023.

Referring to FIG. 3 again, the stent proximal end release assembly 204 includes a core fixing member 2041 and a tail slideway 2042. The core fixing member 2041 is mounted around an outer wall of the inner core 2021. The core fixing member 2041 is located at a proximal end of the three-way pipe fastener 2024. The tail slideway 2042 is mounted around an outer periphery of the core fixing member 2041 and the inner core 2021. The tail slideway 2042 is configured to protect the inner core 2021 and play a decorative role to prevent the inner core 2021 from being exposed. The core fixing member 2041 is fixedly provided at a proximal end of the inner core 2021, and axially and circumferentially limited in the tail slideway 2042, so that the stent proximal end release assembly 204 is prevented from driving the guide head 201 to move freely when the stent 10 is released under control. Specifically, in an embodiment, the core fixing member 2041 is provided with a limiting groove in the circumferential direction, and an inner wall of the tail slideway 2042 is provided with a limiting protrusion engagable with the limiting groove. The tail slideway 2042 is configured to axially limit the core fixing member 2041 and the inner core 2021 to prevent them from moving back and forth axially, and circumferentially limit the core fixing member 2041 and the inner core 2021 to prevent them from rotating circumferentially.

Figure 17:
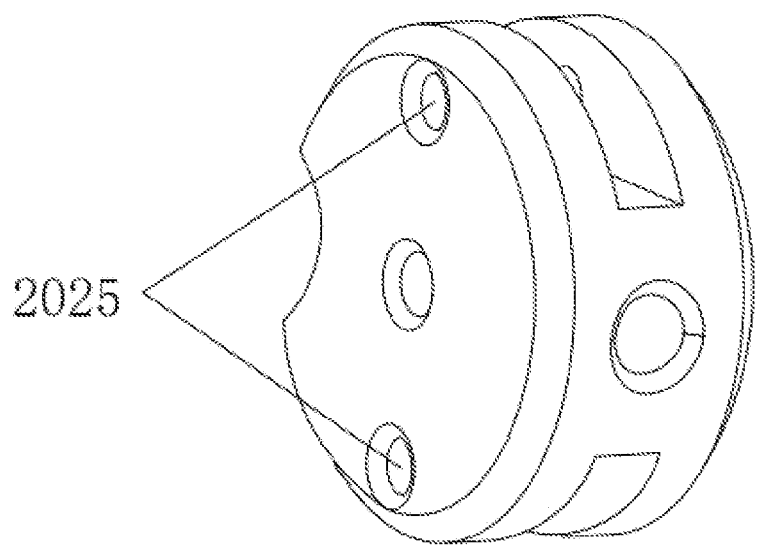
FIG. 17 is a structural schematic view of a core fixing member shown in FIG. 3.

Further, referring to FIG. 17, the core fixing member 2041 includes two through holes 2025 oppositely disposed. The through hole 2025 is arranged such that its central axis is parallel to a central axis of the guide head 201. Two ends of the control member 205 each extend through a respective one of the through holes 2025.

The stent proximal end release assembly 204 further includes an inner lining 2043 and a tail-end fixing member 2044. The inner lining 2043 is mounted around the three-way pipe fastener 2024. A proximal end of the inner lining 2043 is engaged to the tail slideway 2042. The tail-end fixing member 2044 is mounted around and fixed to the inner lining 2043.

The stent proximal end release assembly 204 further includes a tail slider 2045 and a tail-end screw rod 2046. The proximal end of the flexible elongated structure is connected to the tail slider 2045. The tail-end screw rod 2046 is mounted around the proximal end of the core assembly 202, and the tail slider 2045 is mounted around the tail-end screw rod 2046. The tail-end screw rod 2046 drives the tail slider 2045 to move along an extension direction of the core assembly 202, so as to change the axial length of the flexible elongated structure. In the present application, the core fixing member 2041 may be located at any position distal to tail slider 2045, in combination with the design that the inner core fixing member 2041 is mounted on around the inner core 2021, to fix the inner core 2021, and prevent the guide head from being driven to move accidently when the axial length of the control member 205 is adjusted by the tail slider 2045 which affects the folding and releasing of the proximal end of the stent 10. In a specific embodiment, the core fixing member 2041 is arranged between a distal end of the tail slider 2045 and the three-way piper fastener 2024. The tail-end screw rod 2046 is mounted around the proximal end of the inner core 2021, and the tail-end screw rod 2046 has an inner lumen. The proximal end of the inner core 2021 is provided with the Luer fitting 2022, the Luer fitting 2022 is received in the inner lumen of the tail-end screw rod 2046. A proximal end of the tail slideway 2042 is also received in the inner lumen of the tail-end screw rod 2046. The tail-end screw rod 2046 moves along the axial direction of the tail slideway 2042 and rotates along the circumferential direction of the tail slideway 2042.

Figure 10:
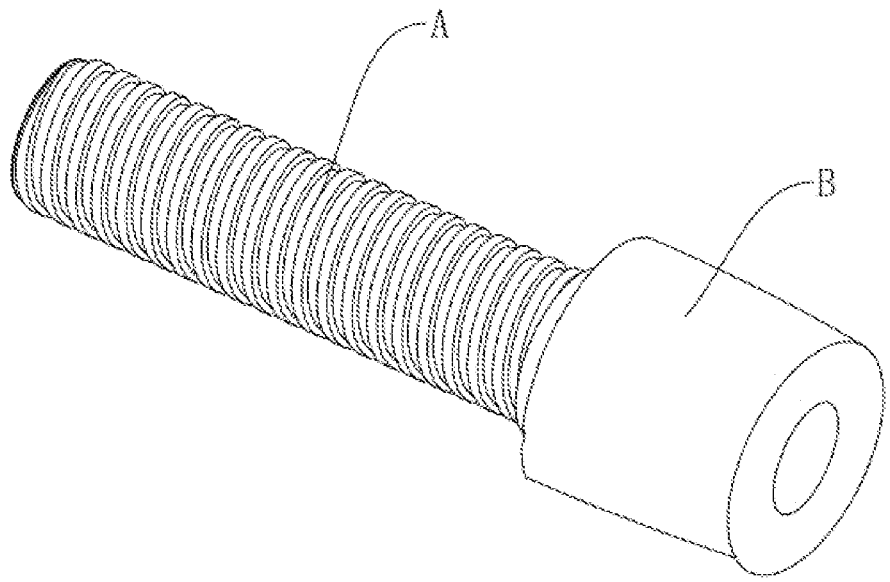
FIG. 10 is a structural schematic view of a tail-end screw rod shown in FIG. 2.
Figure 11:
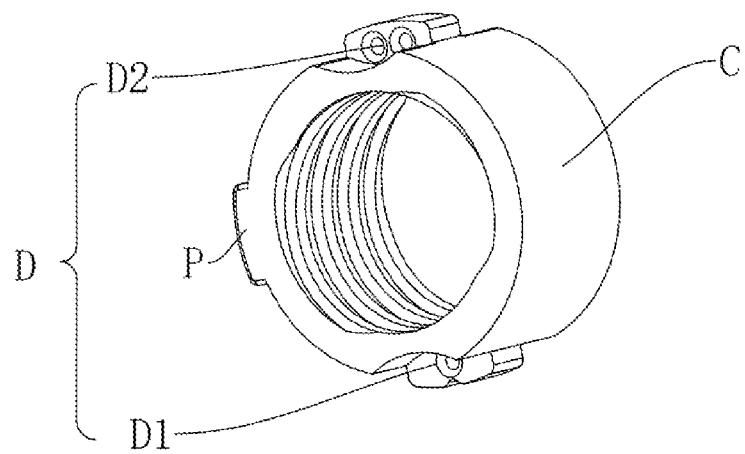
FIG. 11 is a structural schematic view of a tail slider shown in FIG. 2.

Referring to FIGS. 10 and 11, the tail-end screw rod 2046 includes a main rod portion A and a rotating portion B connected to the main rod portion A. The tail slider 2045 has a hallow structure. The tail slider 2045 is mounted around the main rod portion A, and is in threaded connection with the main rod portion A. Therefore, when the rotating portion B is rotated, the tail slider 2045 moves axially along the extension direction of the main rod portion A, by means of the threaded connection between the tail slider 2045 and the main rod portion A. Specifically, the main rod portion A is provided with an external thread, and the tail slider 2045 is provided with an internal thread, to allow the tail slider 2045 to be threaded connected to the main rod portion A. When the trail-end screw rod 2046 is rotated, the trail-end screw rod 2046 drives the tail slider 2045 to move axially. The rotating portion B has an outer diameter that is greater than the outer diameter of the main rod portion A. As such, the larger rotating portion B facilitates rotating the tail-end screw rod, and thus facilitates driving the tail slider 2045 to move.

Referring to FIG. 11, the tail slider 2045 includes a second body portion C and a second fixing member D. The second fixing member D is provided on an outer periphery of the second body portion C, for connection with the control member 205. Specifically, the second fixing member D includes a fixing portion D1 and a winding portion D2, wherein the fixing portion D1 and the winding portion D2 are both provided on an outer wall of the second body portion C, and the fixing portion D1 and the winding portion D2 are opposite to each other. Each of the fixing portion D1 and the winding portion D2 may be provided with a circular hole, wherein the winding portion D2 has two circular holes, and the central axes of the two circular holes are parallel to each other. One end of the control member 205 is fixedly connected to the circular hole of the fixing portion D1, and the other end of the control member 205 extends through the two circular holes of the winding portion D2. The second body portion C has a hallow structure, and the second body portion C is mounted around an outer periphery of the main rod portion A. The second body portion C is movable by threaded connection with the main rod portion A.

The stent proximal end release assembly 204 further includes a tail-end screw cap 2047 and a release slider cover 2048. The tail-end screw cap 2047 is detachably connected to the release slider cover 2048. Specifically, in this embodiment, the tail-end screw cap 2047 is rotatably connected between a proximal end of the sheath assembly 203 and a distal end of the release slider cover 2048, and configured to release the control member 205. The tail-end screw rod 2046 is provided at a proximal end of the release slider cover 2048. When the tail-end screw cap 2047 is disconnected from the release slider cover 2048, the release slider cover 2048 can be controlled by an operator to move towards the proximal end, that is, the tail-end screw cap 2047 is configured to fix the release slider cover 2048 at the proximal end of the sheath assembly 203. After the tail-end screw cap 2047 is loosened by the operator, and the release slider cover 2048 is pulled towards the proximal end, then the release slider cover 2048 can in turn drive the tail-end screw rod 2046 at the proximal end, the tail slider 2045, and the flexible elongated structure to move towards the proximal end. In an alternative embodiment, the tail-end screw cap 2047 is connected between the proximal end of the sheath assembly 203 and the distal end of the release slider cover 2048 by snap-fitting, or detachably connected therebetween by other means.

Specifically, the release slider cover 2048 is mounted around the tail slideway 2042. The tail-end screw cap 2047 is connected between a proximal end of the tail fixing member 2044 and the distal end of the release slider cover 2048. Specifically, an end portion of the control member 205 is detachably clamped between the tail-end screw cap 2047 and the release slider cover 2048. For example, an end of the control member 205 extending through the winding portion D2 is clamped between the tail-end screw cap 2047 and the release slider cover 2048. After the stent 10 is released, the tail-end screw cap 2047 is unscrewed, so the end of the control member 205 extending through the winding portion D2 is loosened; and then the release slider cover 2048 can be withdrawn to drive the tail slider 2045 and the control member 205 to move away from the proximal end of the stent.

Figure 5:
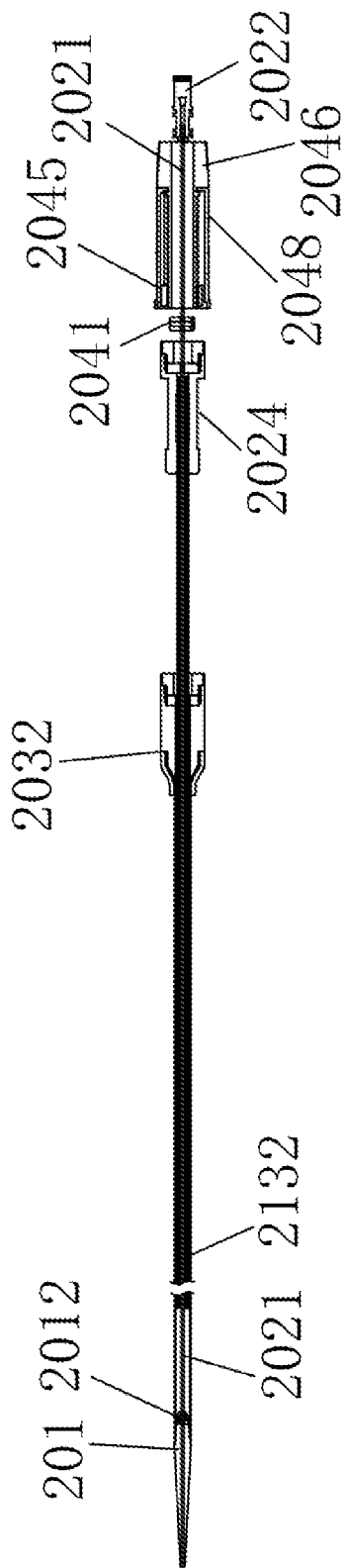
FIG. 5 is a structural schematic cross-sectional view of the part of the structure shown in FIG. 4.
Figure 12:
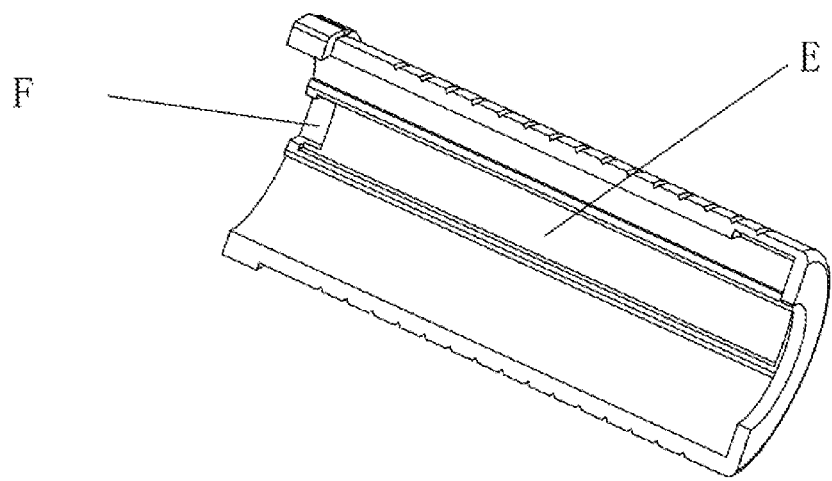
FIG. 12 is a structural schematic view of a release slider cover shown in FIG. 2.
Figure 13:
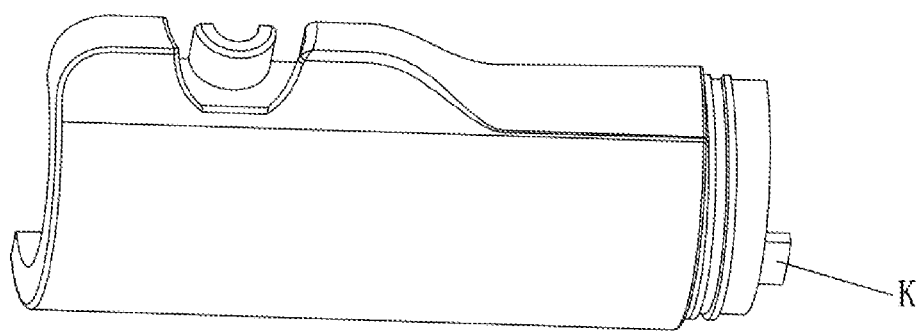
FIG. 13 is a structural schematic view of a tail fixing member shown in FIG. 2.

Referring to FIGS. 5, 12 and 13, specifically, the inner wall of the release slider cover 2048 is recessed to form a sliding groove E along the axial direction, and the tail slider 2045 has a protrusion P on an outer periphery which is engaged in the sliding groove E. The protrusion P can slide along the extension direction of the sliding groove E, to prevent the tail slider 2045 from rotate circumferentially to cause the control member 205 to become tangled and knotted during travel.

Referring to FIGS. 12 and 13, the inner wall of the release slider cover 2048 is further recessed to form an engaging groove F along the axial direction. The engaging groove F is provided at the distal end of the release slider cover 2048, and has a depth greater than that of the sliding groove E. The tail fixing member 2044 includes a latch K extending along the axial direction and facing the release slider cover 2048. The latch K is engaged in the engaging groove F, such that the release slider cover 2048 is engaged in the tail fixing member 2044.

Referring to FIGS. 3, 6 and 7 again, the sheath assembly 203 includes a multi-lumen tube 2031, The multi-lumen tube 2031 is mounted around the outer wall of the inner core 2021 and communicating with the three-way pipe fastener 2024. The multi-lumen tube 2031 has at least one channel for accommodating the control member 205. The multi-lumen tube 2031 and the guide head 201 are spaced apart by a preset distance, to prevent the control member 205 from becoming tangled and knotted during travel. Specifically, the preset distance is provided between the multi-lumen tube 2031 and the guide head 201, and the end of the multi-lumen tube 2031 adjacent to the guide head 201 has good flexibility, allowing the multi-lumen tube 2031 to bend along the blood vessel. This facilitates the stent delivery and release device 20 to reach the lesion site over the guide wire. Two channels are axially provided in the multi-lumen tube 2031, and the two channels are symmetrical. The two ends of the control member 205 extend through the two channels, and then through the circular holes of the fixing portion D1 and winding portion D2 respectively. Then one end of control member 205 is fixed to the fixing portion D1, and the other end extends through the winding portion D2 and through a position between the latch K and the engaging groove F, and is exposed from the outer surface of the tail fixing member 2044.

In the present embodiment, the outer sheath 2132 is mounted around the multi-lumen tube 2031, and a space is reserved between the outer sheath 2132 and the multi-lumen tube 2031 for accommodating the stent 10 in a compressed state.

The sheath assembly 203 further includes an outer sheath driver 2032 and a threaded block 2033. The outer sheath driver 2032 is mounted around and fixed to the outer sheath 2132. Two stop elements 2034 are provided on an outer surface of the outer sheath driver 2032, with a gap defining between the two stop elements 2034. The threaded block 2033 is arranged in the gap, and threaded block 2033 is movable in the axial direction to drive the outer sheath driver 2032 to move, and in turn drive the outer sheath 2132 to move.

Referring to FIGS. 6 to 8 again, the multi-lumen tube 2031 provides the channels for accommodating the control member 205, to prevent the control member 205 from becoming tangled and knotted with other components during travel. Specifically, the multi-lumen tube 2031 includes two through grooves 2133, wherein one of the through grooves 2133 is configured for a respective end of the control member 205 extending therethrough.

Figure 16:
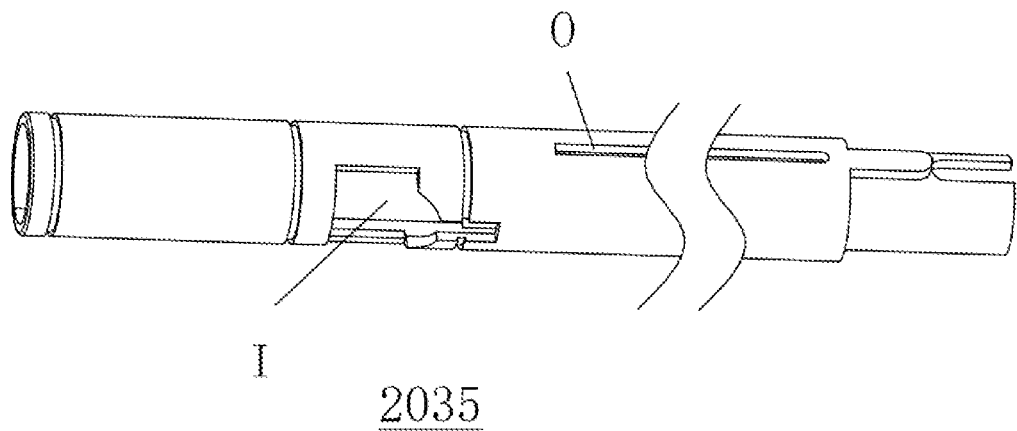
FIG. 16 is a structural schematic view of a main slideway shown in FIG. 3.

The sheath assembly 203 further includes a main slideway 2035 and an end fastener 2036. The end fastener 2036 is mounted around a distal end of the outer sheath 2132, and spaced apart from outer sheath driver 2032 with a distance. The main slideway 2035 is mounted around the outer sheath 2132 and the outer sheath driver 2032. A distal end of the main slideway 2035 is spaced apart from the end fastener 2036 with a distance, and a proximal end of the main slideway 2035 is engaged with the three-way pipe fastener 2024. The main slideway 2035 is provided with an axial opening (referring to FIG. 16), and the two stop elements 2034 extend out of the axial opening O and are slidable along the extension direction of the axial opening O. The inner lining 2043 in the present application is also mounted around the proximal end of the main slideway 2035.

The sheath assembly 203 further includes a fixed handle 2037 and a button 2038. The fixed handle 2037 is provided outside the multi-lumen tube 2031 and the main slideway 2035. A distal end of the fixed handle 2037 is engaged with the end fastener 2036. The main slideway 2035 further includes a button opening I, the fixed handle 2037 includes an engaging opening, and the button opening I is arranged opposite to the engaging opening. The button 2038 is engaged in the engaging opening and the button opening I.

The sheath assembly 203 further includes a sliding handle 2039 and a sliding handle screw cap 2131. The sliding handle 2039 is mounted around an outer periphery of the main slideway 2035. The sliding handle screw cap 2131 is rotatably connected between a distal end of the sliding handle 2039 and a proximal end of the fixed handle 2037. The sliding handle 2039 is fixed to the fixed handle 2037 by engagement the button 2038.

The button 2038 includes a head G and a rod H connected with the head G. The rod H extends into the engaging opening and the button opening. The head G is provided with a hook G1. An inner wall of the sliding handle 2039 is provided with a protrusion. The hook G1 is engaged with the protrusion, so that the sliding handle 2039 is engaged to the fixed handle 2037. Specifically, the inner wall of the sliding handle 2039 at the distal end is recessed to form an annular protrusion. The hook G1 extends through the sliding handle screw cap 2131 and hooks onto the protrusion on the inner wall at the distal end of the sliding handle 2039.

When the stent 10 needs to be released, the outer sheath 2132 is withdrawn to expose a part of the stent 10, then the button 2038 is pressed, which is disconnected from the sliding handle 2039. The sliding handle 2039 is threaded connected to the threaded block 2033, and the sliding handle 2039 is rotated to drive the threaded block 2033 to move axially, which in turn drives the outer sheath 2132 to move. This achieves the slow movement of the outer sheath 2132, to release the proximal end of the stent in a compressed state. Then the release amount of the control member 205 is adjusted by the stent proximal end release assembly 204, to accurately control the release of the proximal end of the stent, and ensure the accuracy of the position where the proximal end of the stent is released. In the event of an inaccurate release, the proximal end of the stent 10 can be retracted and then the position to be released is adjusted, and the proximal end of the stent 10 is finally released to an accurate position after repeated retraction and release of the proximal end of the stent. After the proximal end of the stent is accurately released, the outer sheath 2132 is further withdrawn, to expose the whole stent. Accordingly, after the button 2038 is pressed, the button 2038 is disconnected from the sliding handle 2039, and then a surgeon can move the threaded block 2033 and the outer sheath 2132 by controlling the sliding handle 2039 and the sliding handle screw cap 2131 to move along the main slideway 2035, rather than moving the threaded block 2033 and the outer sheath 2132 by rotating the sliding handle 2039 assembly, This way achieves a faster movement, that is, the outer sheath 2132 is moved rapidly, which is convenient for the quick release of the distal end of the stent after the accurate release of the proximal end of the stent.

Accordingly, the control member 205 in this embodiment extends through a plurality of connecting members 101 in sequence, and then one end of the control member 205 extends through one channel 2133 of the multi-lumen tube 2031 and one through hole 2025 of the core fixing member 2041 and fixed to the fixing portion D1 of the tail slider 2045; and the other end of the control member 205 extends through the other channel 2133 of the multi-lumen tube 2031 and the other through hole 2025 of the core fixing member 2041 and then through the two circular holes in the winding portion D2 of the tail slider 2045, and then extends backwards through a position between the latch and the engaging groove F to be exposed on the outer surface of the tail fixing member 2044. Therefore, when the tail-end screw rod 2046 rotates to drive the tail slider 2045 to move away from the guide head 201, the control member 205 is pulled, and the proximal end of the stent 10 provided with the connecting member 101 is pulled to approach the guide head 201; and when the tail-end screw rod 2046 rotates to drive the tail slider 2045 to move towards the guide head 201, the control member 205 is loosened to expand the proximal end of the stent 10 provided with the connecting members 101. In addition, the stent 10 may also not be provided with the connecting members 101. In that case, the control member 205 can directly extend through the peaks at the proximal end of the stent 10 in sequence, which can also achieve adjustment of the folding and expanding of the stent 10. The control member 205 may be a thin wire or other elongated structures with good flexibility and tensile strength.

The control member 205 will be described hereinafter. The control member 205 includes a flexible elongated structure 2051. In an embodiment, the control member 205 further includes a rigid elongated structure. The material of the control member 205 includes, but is not limited to, a polymer material, a fiber material, or a metal material, etc. Optionally, the flexible elongated structure has a diameter in the range of 0.1-0.4 mm; and the rigid elongated structure has a diameter in the range of 0.1-0.4 mm.

In this embodiment, the control member 205 is a flexible elongated structure 2051. The fixing portion D1 and the winding portion are provided with two circular holes respectively, and the two ends of the control member 205 extend through the two circular holes respectively. With the control member having been wound around the proximal end of the stent 10, one end of the control member 205 is fixedly connected to the fixing portion D1 after extending through the first fixing member 2012, and the other end of the control member 205 is detachbaly fixed to the second fixing member D after extending through the first fixing member 2012. After the stent 10 is released, one end of the control member 205 is detached from the second fixing member D, disengaged from the circular hole, and finally withdrawn from the body together with the stent delivery and release device 20.

Figure 7:
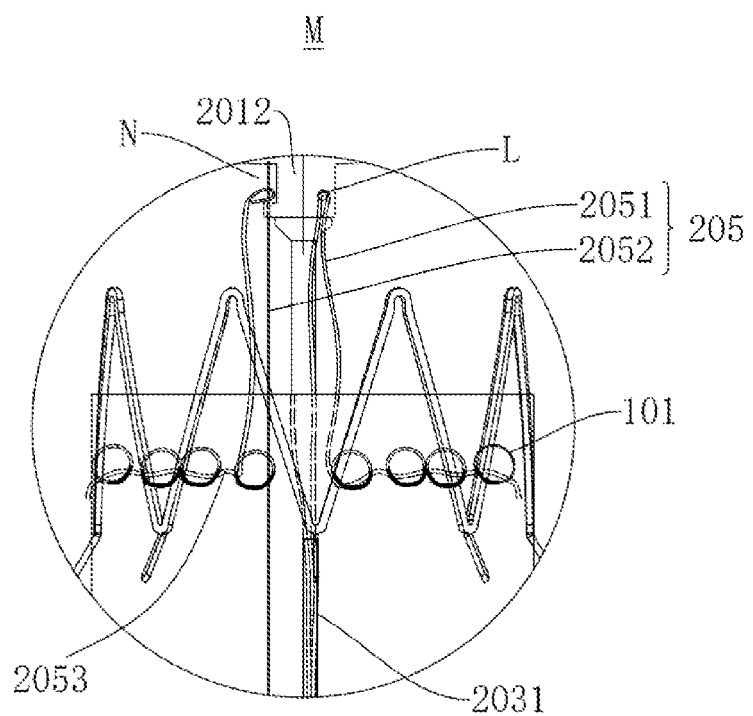
FIG. 7 is another structural schematic view of the portion M shown in FIG. 1.
Figure 14A:
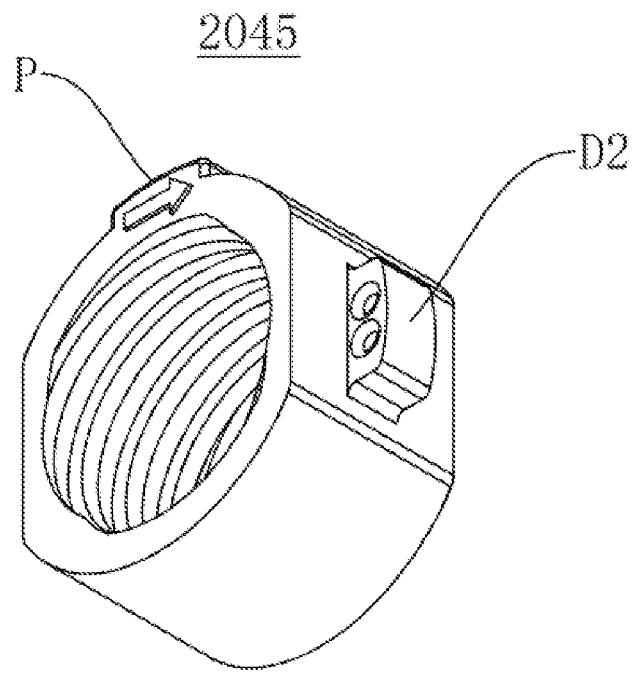
FIG. 14a is another structural schematic view of the tail slider shown in FIG. 2.
Figure 14B:
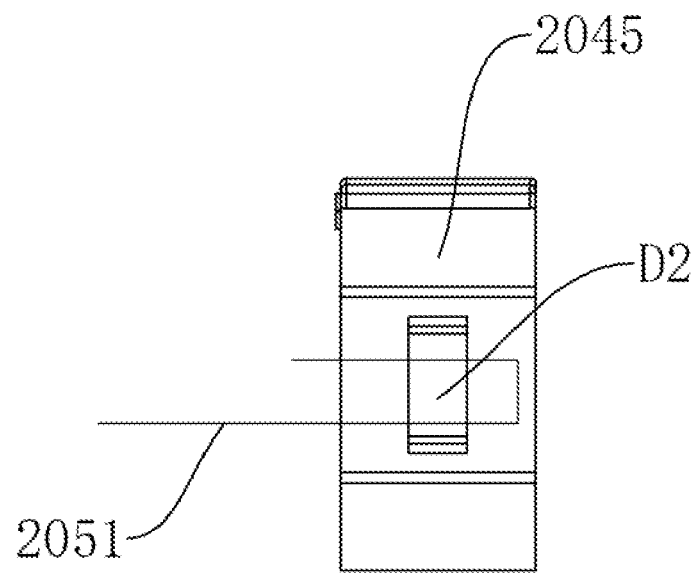
Figure 15A:
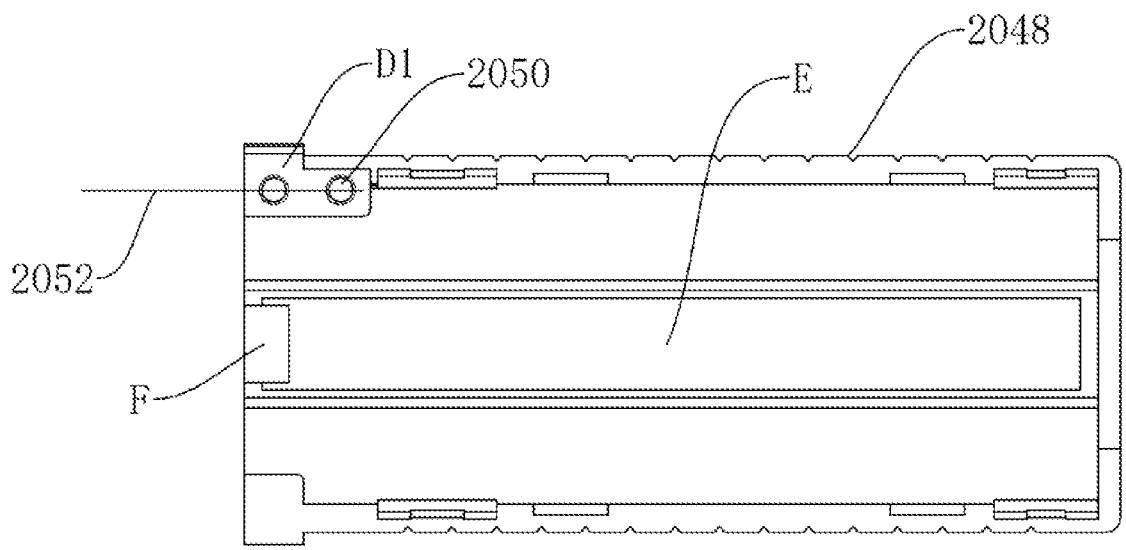
FIG. 15a is another structural schematic view of the release slider cover shown in FIG. 2.
Figure 15B:
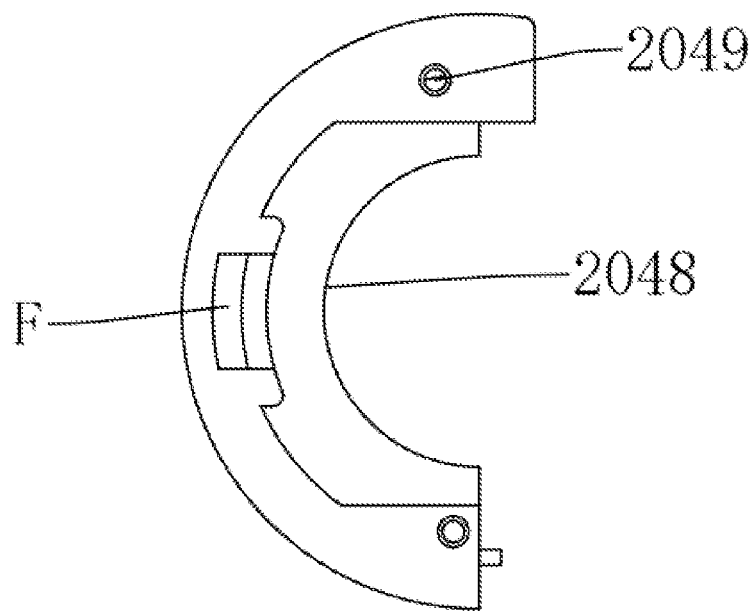

Referring to FIGS. 7, 13, and 14, in another specific embodiment, the control member 205 includes a flexible elongated structure 2051 and a rigid elongated structure 2052. The first fixing member 2012 is provided with a fixing slot N and an aperture L. A distal end of the rigid elongated structure 2052 abuts against a wall of the fixing slot N, a distal end of the flexible elongated structure 2051 is fixed by the rigid elongated structure 2052 in the fixing slot N, and a proximal end of the rigid elongated structure 2052 is fixed to the release slider cover 2048. When the rigid elongated structure 2052 moves proximally together with the release slider cover 2048, the distal end of the flexible elongated structure 2051 is disengaged from the fixing slot N. Specifically, one end of the flexible elongated structure 2051 is mounted around the distal end of the rigid elongated structure 2052, the distal end of the rigid elongated structure 2052 is engaged in the fixing slot N. The other end of the flexible elongated structure 2051 extends through the aperture L after surrounding the stent 10, and detachably fixed to the first fixing member 2012. The distal end of the rigid elongated structure 2052 is detachably fixed to the first fixing piece 2012. After the stent 10 is released, the rigid elongated structure 2052 is withdrawn to release the flexible elongated structure 2051, and at the end the control member 205 is withdrawn from the body together with the stent delivery and release device 20. This embodiment differs from the above embodiment in that the control member 205 includes a flexible elongated structure 2051 and a rigid elongated structure 2052, and the first fixing member 2012 is provided with an aperture L and a fixing slot N. The distal end of the rigid elongated structure 2052 is engaged in the fixing slot N; the distal end of the flexible elongated structure 2051 is wound around a portion of the rigid elongated structure 2052 located in the fixing slot N. As shown in FIGS. 13 and 14, the second fixing member D includes a winding portion D2 provided on the outer wall of the tail slider 2045 and a fixing portion D1 provided on the inner wall of the release slider cover 2048. The proximal end of the flexible elongated structure 2051 extends through the aperture L and is then connected to the winding portion D2 of the tail slider 2045. The fixing portion D1 is provided with a fixing hole 2049 and two threaded holes 2050. A central axis of the fixing hole 2049 is parallel to the central axis of the tail slider 2045. Central axes of the two threaded holes 2050 are perpendicular to the central axis of the fixing hole 2049. The two threaded holes 2050 communicate with the fixing hole 2049. The proximal end of the rigid elongated structure 2052 extends into the fixing hole 2049. The rigid elongated structure 2052 is restrained in the fixing hole 2049 by screws in threaded connection with the threaded holes 2050, so as to fix the rigid elongated structure 2052 to the inner wall of the release slider cover 2048. This ensures the stability of the rigid elongated structure 2052 when the flexible elongated structure 2051 is driven to control the release of the proximal end of the stent 10. When the rigid elongated structure 2052 needs to be withdrawn, the operator can pull the release slider cover 2048 in a direction away from the guide head 201 when the tail-end screw cap 2047 is disengaged with the release slider cover 2048.

Particularly, the distal end of the flexible elongated structure 2051 is provided with a winding section 2053, wherein one end of the winding section 2053 is fixed in the fixing slot N, and the other end of the winding section 2053 extends through the aperture L. The winding section 2053 is configured to be wound onto the stent 10, for example, the proximal end of the stent 10. The positions of two ends of the winding section 2053 are positioned by the fixing slot N and the aperture L, and thus the position of the stent where the winding section 2053 is wound around is determined, thus improving the stability of the system. The delivery and release sequence of the stent 10 in this embodiment is the same as that in the above embodiment, with the improvement that the path and time of withdrawing the flexible elongated member 2051 of the control member 205 in this embodiment has been reduced by half, thereby reducing the risk of becoming tangled and knotted when the stent 10 is adjusted for release by the flexible control member 205, reducing the operation time, and improving the efficiency and safety.

The delivery and release of the stent 10 by the stent delivery and release device 20 is briefly described hereinafter.

The stent 10 is retracted at the guide head 201. the outer sheath 2132 abuts against the guide head 201. At this time, the control member 205 is detachably connected to the guide head 201. One end of the flexible elongated structure 2051 extends through the connecting member 101 at the proximal end of the stent 10, and the other end is fixed to the winding portion D2 of the tail slider 2045. The rigid elongated structure 2052 is fixed to the fixing hole inside the release slider cover 2048. The tail slider 2045 is located at the proximal end of the tail-end screw rod 2046 so that the control member 205 is in a tensioned state.

The stent 10 is delivered to the lesion site of aortic by the stent delivery and release device 20 over the guide wire previously inserted into the human body. The outer sheath driver 2032 is driven to move the outer sheath 2132 away from the guide head 201, so that the proximal end of the stent 10 is exposed. The stent proximal end release assembly 204 is adjusted to release the proximal end of the stent 10. If the release position of the stent 10 is not accurate, the control member 205 is pulled to fold the stent 10 to the first fixing member 2012 of the guide head 201, and then the stent delivery and release device 20 is adjusted slightly, to align the stent 10 with the lesion site again; and then the proximal end of the stent 10 is released.

If the release position of the proximal end of the stent 10 is accurate, the tail fixing member 2044 is held tightly to keep it stationary, the tail-end screw cap 2047 is unscrewed, and then the release slider cover 2048 is axially slowly moved away from the guide head 201 by a distance of at least 100 mm, to drive the tail slider 2045, the tail-end screw rod 2046, and the control member 205 to be withdrawn into the multi-lumen tube 2031 from outside of the multi-lumen tube 2031.

After the control member 205 enters the multi-lumen tube 2031, the button 2038 is pressed and the sliding handle 2039 is moved quickly to move the outer sheath 2132, and release the distal end of the stent 10. After the release, the stent delivery and release device 20 is withdrawn from the human body.

Therefore, multi-step release of the stent 10 including releasing the proximal end first and then the distal end of the stent 10 is achieved by the stent delivery and release device 20. In addition, the stent 10 may be repeatedly retracted and released by the proximal end release assembly, to ensure that the stent 10 is properly released to an appropriate site of lesion site, ensure the therapeutic effect of the stent 10, and avoid a series of problems caused by the deviated release position of the stent 10.

Preferred embodiments of the present disclosure have been described above; however, the protection scope of the present disclosure is not limited thereto. Those of ordinary skill in the art can understand that all or part of the processes implementing the above-described embodiments and equivalent changes made according to the claims of the present disclosure are all contemplated in the scope of the present disclosure.

What is claimed is:

1. A stent delivery and release device, comprising a stent proximal end release assembly, a guide head and a control member, wherein the stent proximal end release assembly is provided at a proximal end of the stent delivery and release device, the guide head is provided at a distal end of the stent delivery and release device, and an external stent is configured to be loaded between the guide head and the stent proximal end release assembly; a proximal end of the control member is connected to the stent proximal end release assembly, at least part of a distal end of the control member is wound around the stent and detachably connected to the guide head; and the stent proximal end release assembly folds or releases the stent by controlling an axial length of the control member.

2. The stent delivery and release device according to claim 1, wherein the control member comprises a flexible elongated structure, and at least part of the flexible elongated structure is wound around the proximal end of the stent.

3. The stent delivery and release device according to claim 2, wherein the guide head comprises a first body portion and a first fixing member, the first fixing member is provided at a proximal end of the first body portion, and the first fixing member is detachably connected to the control member.

4. The stent delivery and release device according to claim 3, wherein the first fixing member is provided with a through hole, a hook, a slot or a combination thereof, which is configured to fix the control member.

5. The stent delivery and release device according to claim 2, wherein the stent proximal end release assembly comprises a tail slider and a tail-end screw rod, the tail slider is mounted around the tail-end screw rod, a proximal end of the flexible elongated structure is connected to the tail slider, and the tail-end screw rod is configured to drive the tail slider to move axially, so as to change an axial length of the flexible elongated structure.

6. The stent delivery and release device according to claim 5, wherein the tail slider comprises a second body portion and a second fixing member, and the second fixing member is provided on an outer periphery of the second body portion, for connection with the control member.

7. The stent delivery and release device according to claim 6, wherein the tail-end screw rod comprises a main rod portion and a rotating portion connected with the main rod portion, wherein the second body portion has a hollow structure and is mounted around an outer periphery of the main rod portion, and is movable by means of threaded connection with the main rod portion.

8. The stent delivery and release device according to claim 6, wherein the stent proximal end release assembly further comprises a release slider cover, an inner wall of the release slider cover is recessed to form a sliding groove in the axial direction, and the second fixing member of the tail slider is engaged in the sliding groove and slidable along an extending direction of the sliding groove.

9. The stent delivery and release device according to claim 8, wherein the stent proximal end release assembly further comprises a tail-end screw cap, the tail-end screw cap is detachably connected to a distal end of the release slider cover; and the tail-end screw rod is provided at a proximal end of the release slider cover; and wherein when the tail-end screw cap is disconnected from the release slider cover, the tail-end screw rod is drivable by the release slider cover to move proximally.

10. The stent delivery and release device according to claim 9, wherein an end portion of the control member is detachably clamped between the tail-end screw cap and the release slider cover.

11. The stent delivery and release device according to claim 9, wherein the control member further comprises a rigid elongated structure, and the guide head is provided with a fixing slot;

wherein a distal end of the rigid elongated structure abuts against a wall of the fixing slot; a distal end of the flexible elongated structure is fixed by the rigid elongated structure in the fixing slot; and wherein a proximal end of the rigid elongated structure is fixed to the release slider cover; and when the rigid elongated structure moves proximally with the release slider cover, the distal end of the flexible elongated structure is disengaged from the fixing slot.

12. The stent delivery and release device according to claim 11, wherein the guide head is further provided with an aperture, the distal end of the flexible elongated structure is provided with a winding section, and wherein one end of the winding section is configured to be fixed in the fixing slot, another end of the winding section extends through the aperture, and the winding section is configured to be wound around the stent.

13. The stent delivery and release device according to claim 1, further comprising a sheath assembly, wherein the sheath assembly comprises a multi-lumen tube, and the multi-lumen tube is provided with at least one channel for accommodating the control member.

14. The stent delivery and release device according to claim 13, further comprising a core assembly, wherein the core assembly comprises an inner core connected to a proximal end of the guide head, and the multi-lumen tube is mounted around an outer wall of the inner core, and wherein the stent proximal end release assembly further comprises a core fixing member and a tail slideway, and wherein the core fixing member is fixedly arranged on the outer wall of the inner core, and core fixing member is axially and circumferentially limited in the tail slideway.

15. A stent delivery and release system, comprising a stent, and a stent delivery and release device according to claim 1, wherein the stent is configured to be loaded between the guide head and the stent proximal end release assembly.

16. The stent delivery and release system according to claim 15, wherein the control member comprises a flexible elongated structure, and at least part of the flexible elongated structure is wound around the proximal end of the stent.

17. The stent delivery and release system according to claim 16, wherein the guide head comprises a first body portion and a first fixing member, the first fixing member is provided at a proximal end of the first body portion, and the first fixing member is detachably connected to the control member.

18. The stent delivery and release system according to claim 16, wherein the stent proximal end release assembly comprises a tail slider and a tail-end screw rod, the tail slider is mounted around the tail-end screw rod, a proximal end of the flexible elongated structure is connected to the tail slider, and the tail-end screw rod is configured to drive the tail slider to move axially, so as to change an axial length of the flexible elongated structure.

19. The stent delivery and release system according to claim 18, wherein the tail slider comprises a second body portion and a second fixing member, and the second fixing member is provided on an outer periphery of the second body portion, for connection with the control member.

20. The stent delivery and release system according to claim 19, wherein the tail-end screw rod comprises a main rod portion and a rotating portion connected with the main rod portion, wherein the second body portion has a hollow structure and is mounted around an outer periphery of the main rod portion, and is movable by means of threaded connection with the main rod portion.

* * * * *